United States Patent
Cheon

(10) Patent No.: US 6,243,463 B1
(45) Date of Patent: Jun. 5, 2001

(54) PORTABLE PHONE CRADLE HAVING A LOCKING MODULE FOR A VEHICLE

(75) Inventor: Yong-Woo Cheon, Kumi (KR)

(73) Assignee: Samsung Electronics Co., Ltd. (KR)

( * ) Notice: Subject to any disclaimer, the term of this patent is extended or adjusted under 35 U.S.C. 154(b) by 0 days.

(21) Appl. No.: 09/262,581

(22) Filed: Mar. 4, 1999

(30) Foreign Application Priority Data

Mar. 5, 1998 (KR) .................................................. 98-7285

(51) Int. Cl.[7] ........................................................ H04M 1/00

(52) U.S. Cl. ............................................. 379/446; 379/455

(58) Field of Search ................................... 379/446, 455, 379/454, 447; 455/90, 575

(56) References Cited

U.S. PATENT DOCUMENTS 5,113,436 * 5/1992 Jarvela et al. ........................ 379/455

* cited by examiner

Primary Examiner—Jack Chiang
(74) Attorney, Agent, or Firm—Dilworth & Barrese, LLP

(57) ABSTRACT

A phone cradle having a locking module for a vehicle is provided. The locking module includes a base frame having first, second and third compartments, supporters at opposite positions, and a fixing portion extending downwardly. A locker key configured for movement along an axis thereof is placed in the third compartment and wound with a key spring. An ejector cam is movably fixed to the lower surface of the base frame and includes a hinge hole at one end, an erect pressed plate at another end configured to interlock with the locker key, a pressing portion perpendicular to the pressed plate at a third end, and a guide hole for radially moving the ejector cam a limited degree with respect to the hinge hole. A locker is movably fixed to the supporters and operatively associated with the locker key to receive a force via the pressing portion of the ejector cam upon movement of the locker key along the axis thereof. The locker is configured to move in a direction substantially perpendicular to the direction of movement of the locker key. A locker spring having a first end supported by the locker and a second end fixed to the fixing portion of the base frame applies a restoring force to the locker to return the locker to an inoperative mode after the locker is moved by the force transferred by the locker key. First and second ejectors are inserted into the first and second compartments, respectively, for supporting the phone when the phone is fixed in the phone cradle and for upwardly pushing the phone when the locker key is moved along the axis thereof to remove the phone from the phone cradle.

15 Claims, 6 Drawing Sheets

PORTABLE PHONE CRADLE HAVING A LOCKING MODULE FOR A VEHICLE

BACKGROUND

1. Field of the Invention

The present application relates generally to a portable phone cradle, and in particular, to a portable phone cradle having a locking module for a vehicle.

2. Description of the Related Art

A cradle for a portable phone functions to fixedly hold the portable phone for preventing the portable phone from falling. A portable phone cradle for a vehicle is generally designed to hold the portable phone and to have strong resistance against vibration and shock which typically occurs when the vehicle is moving thereby leaving the hands of a user free.

A phone cradle for holding a portable phone in a vehicle is disclosed in Korea Application No. 95-16852 titled "Cradle for Portable Radio Telephone". This cradle finds its application in a portable phone manufactured by the assignee of the present application. This phone cradle is similar to conventional phone cradles which are designed for vehicles and require formation of locking grooves on both side surfaces of a portable phone for engagement with hooks to fixedly hold the portable phone. Thereby, conventional phone cradles are not universal in design for not conforming to the dimensions of a typical portable phone.

To overcome this limitation indicative of conventional phone cradles, a need exists for a phone cradle having a locking module for a vehicle which fixedly holds a portable phone having locking grooves on the upper and lower surfaces thereof.

Further, a need exists for a phone cradle having a locking module for a vehicle where the direction of pressing a locker key of the locking module is perpendicular to the direction of movement of a locker for upwardly releasing the portable phone.

SUMMARY

The present application is directed to a phone cradle having a locking module for a vehicle. The locking module includes a base frame having first, second and third compartments, supporters at opposite positions, and a fixing portion extending downwardly. A locker key configured for movement along an axis thereof is placed m the third compartment and wound with a key spring. An ejector cam is movably fixed to the lower surface of the base frame and includes a hinge hole at one end, an erect pressed plate at another end configured to interlock with the locker key, a pressing portion perpendicular to the pressed plate at a third end, and a guide hole for radially moving the ejector cam a limited degree with respect to the hinge hole.

A locker is movably fixed to the supporters and operatively associated with the locker key to receive a force via the pressing portion of the ejector cam upon movement of the locker key along the axis thereof. The locker is configured to move in a direction substantially perpendicular to the direction of movement of the locker key. A locker spring having a first end supported by the locker and a second end fixed to the fixing portion of the base frame applies a restoring force to the locker to return the locker to an inoperative mode after the locker is moved by the force transferred by the locker key. First and second ejectors are inserted into the first and second compartments, respectively, for supporting the phone when the phone is fixed in the phone cradle and for upwardly pushing the phone when the locker key is moved along the axis thereof to remove the phone from the phone cradle.

DETAILED DESCRIPTION OF PREFERRED EMBODIMENTS

Figure 1:
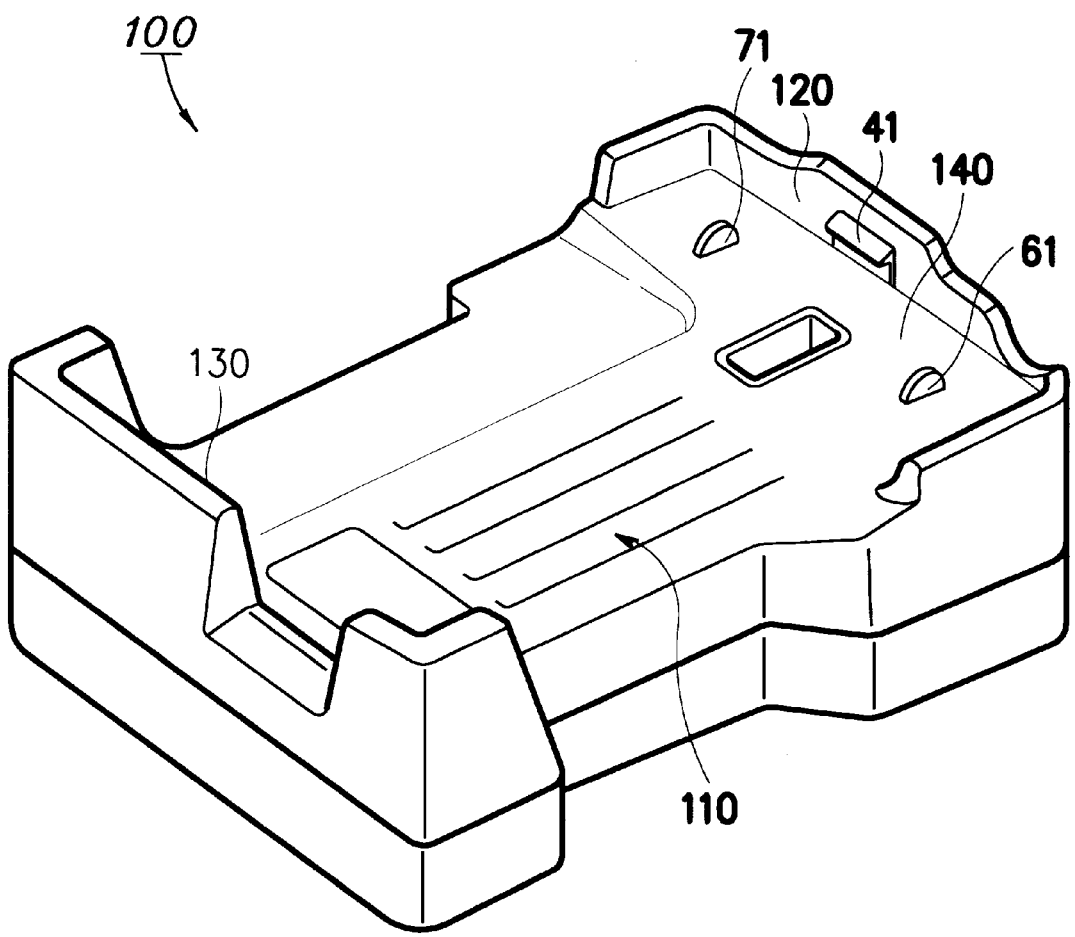
FIG. 1 is a perspective view of a phone cradle having a locking module for a vehicle in accordance with the present invention.

It is to be understood that in the following description of a preferred embodiment, specific details are set forth to provide a more thorough understanding of the present invention, notwithstanding that one skilled in the art may practice the invention without these specific details. In other instances, a detailed description of well known functions or constructions have been omitted so as to not obscure the present invention. It is to be further understood that in the accompanying drawings, similar reference numerals are used to denote elements having similar or equivalent constructions.

Referring to FIG. 1, a portable phone cradle 100 of the present invention is shown. The cradle 100 includes fixing points on upper and lower inside surfaces 120 and 130 for fixing thereto a portable phone of the type having locking grooves on the upper and lower surfaces thereof. It is contemplated that the cradle 100 may include a locking mechanism to fixedly link the portable phone to a hands free car kit. It is further contemplated to design the cradle 100 to hold any type of phone, and not necessarily a portable phone.

A hook 41 of a locker 4 in a locking module 10 (FIG. 2) within the cradle 100 is exposed from the upper inside surface 120 and an engaging protrusion (not shown) is integrally formed on the lower inside surface 130. Upper end portions 61 and 71 of first and second ejectors of the locking module 10 are exposed from the surface of a cradle plate 110. The hook 41 and upper end portions 61 and 71 of the ejectors are capable of retreating when the phone is placed on the cradle plate 110.

Figure 2:
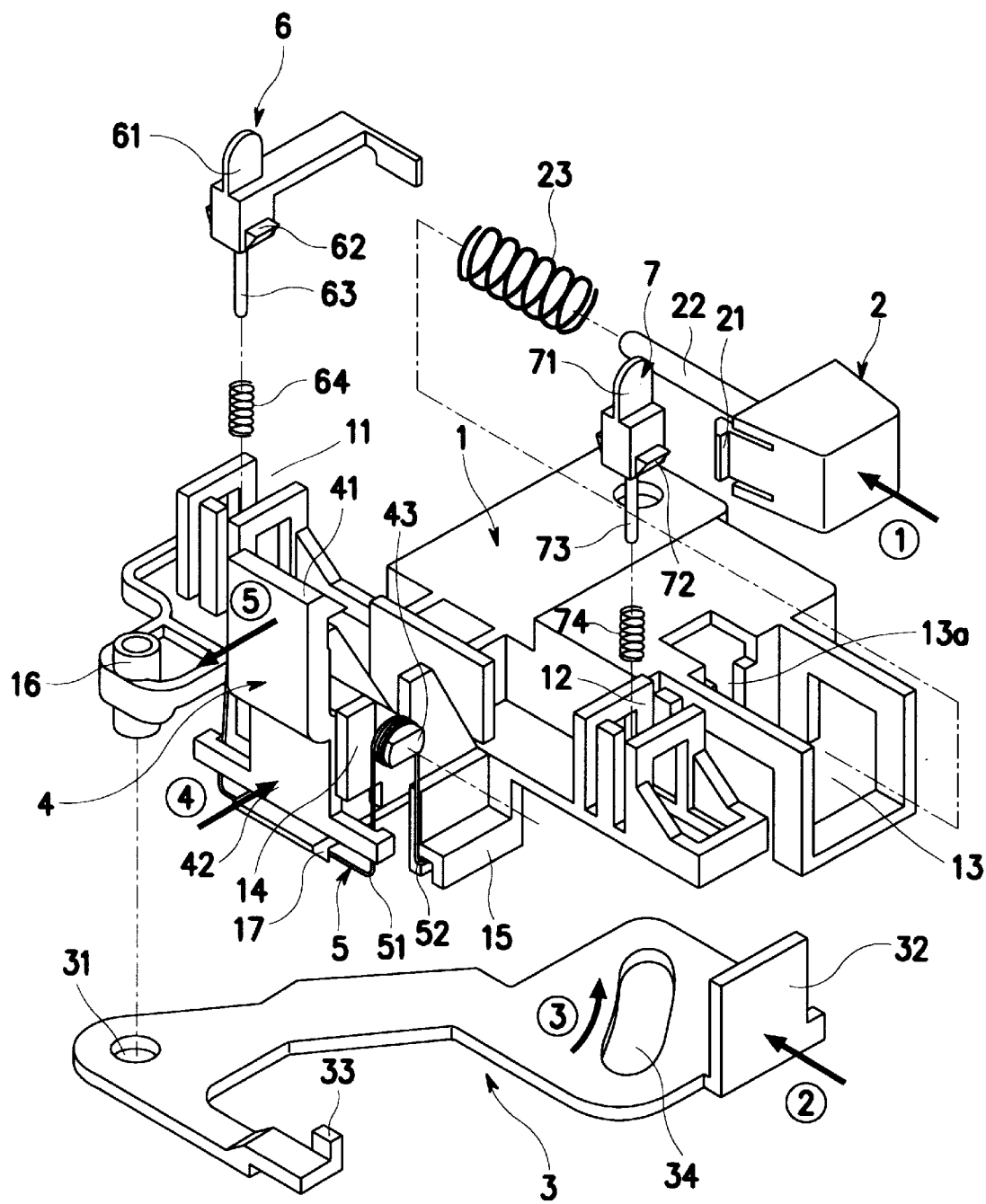
FIG. 2 is an exploded perspective view of the locking module of the phone cradle shown in FIG. 1.
Figure 3:
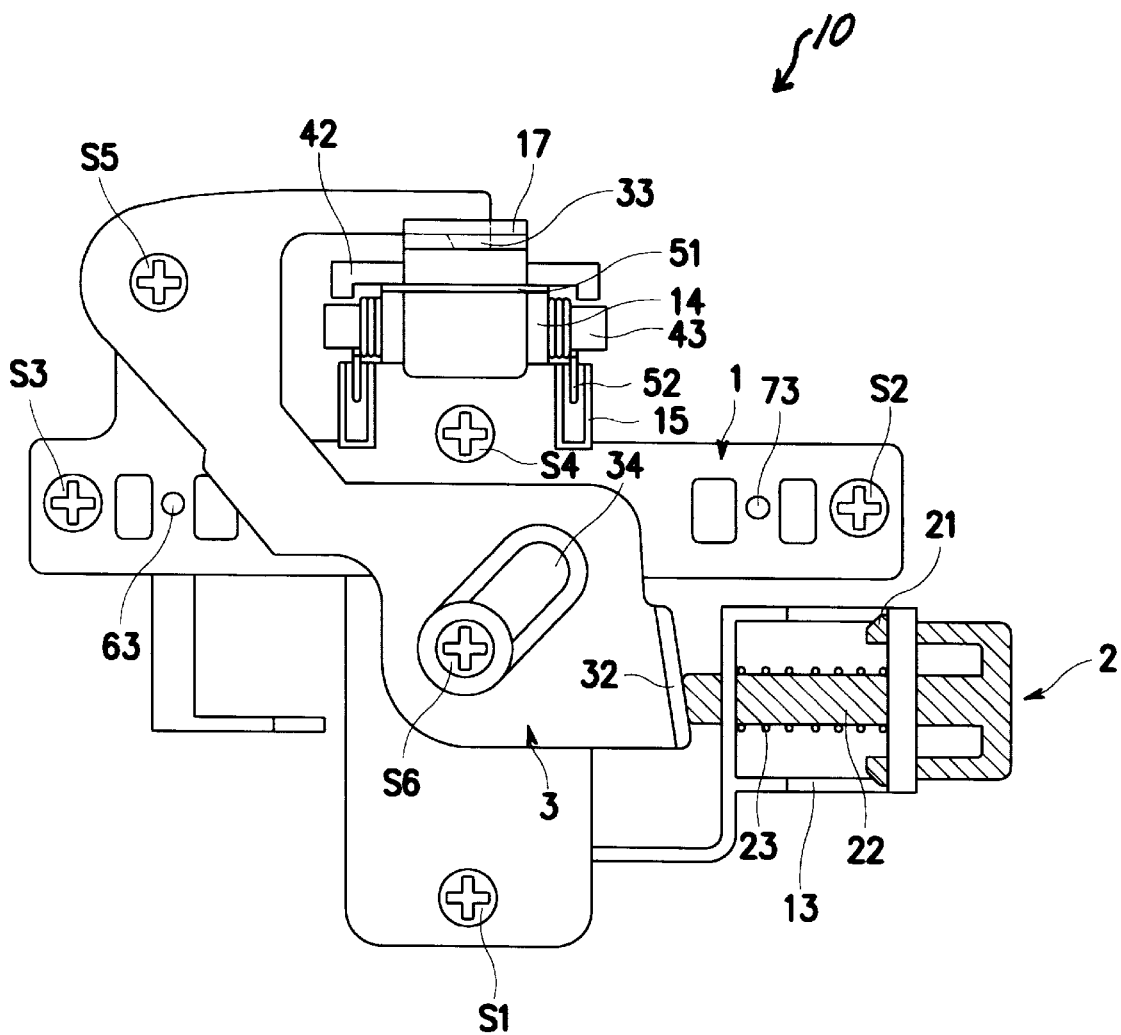
FIG. 3 is a bottom view of the locking module in an inoperative mode after a portable phone is placed and locked to the phone cradle.
Figure 4:
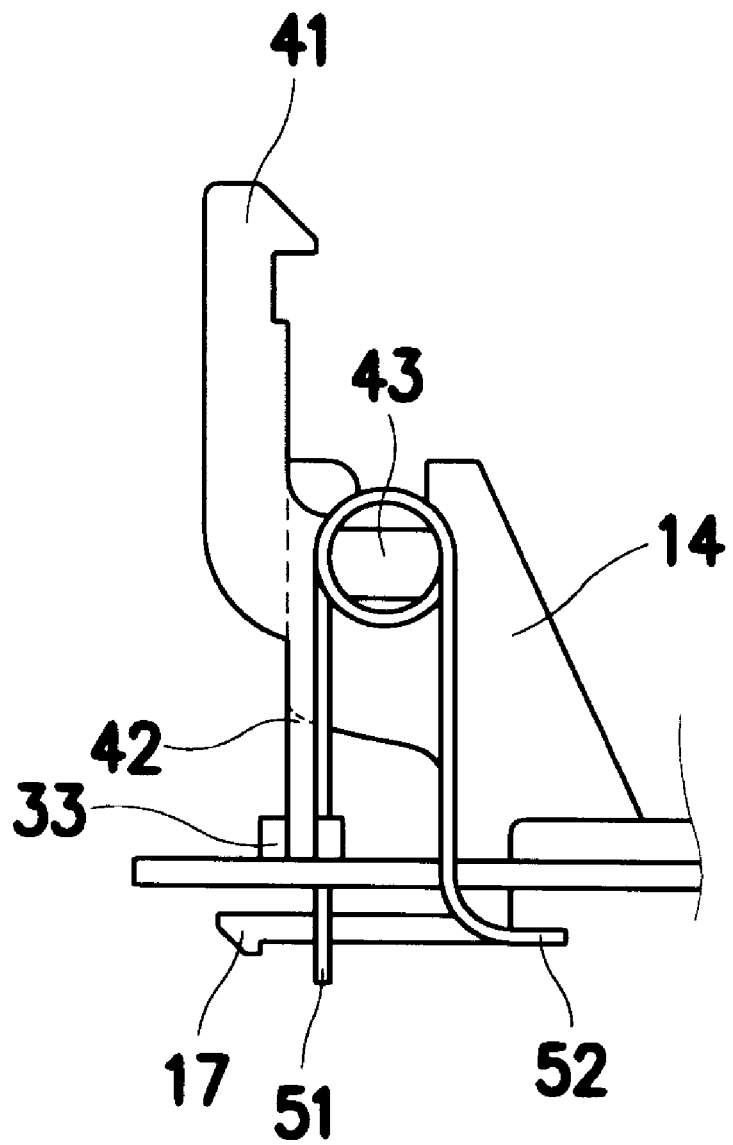
FIG. 4 is a partial side view of the locking module in the mode shown in FIG. 3.

The locking module 10 positioned underneath the cradle plate 110 functions to fixedly hold the portable phone and prevent the portable phone from falling due to vibration and shock. The locking module 10 will now be described with reference to FIGS. 2 to 6. Referring to FIGS. 2 to 4, the locking module 10 includes a locker key 2 where the direction of movement of the locker key 2 upon depression is substantially perpendicular to the direction of movement of the locker 4 for releasing the portable phone from the cradle 10. Further, upon depression of the locker key 2 along an axis thereof to release the portable phone from the cradle 10, first and second ejectors 6 and 7 provided at opposite sides of the locking module 10 automatically eject and detach the portable phone from the cradle.

A base frame 1 of the locking module 10 includes first, second and third compartments 11, 12 and 13, and erect supporters 14 at opposite positions of a frontal portion. A cylindrical protrusion 16 extends from the base frame 1 for acting as a rotational shaft when it is fitted within hinge hole 31 of ejector cam 3. A fixing portion 15 and an engaging portion 17 are provided under the supporters 14. The locker 4 is movably fixed to the supporters 14 for locking or unlocking the portable phone.

The locker key 2 is placed in the third compartment 13 and the ejector cam 3 is engaged upwardly and secured to the base frame 1 via a screw S6 fitted within guide hole 34. The ejector cam 3 has the hinge hole 31 at a first end; a pressed plate 32 upwardly protruding from a second end which interlocks with the locker key 2 when the ejector cam 3 is engaged with the base frame 1; and a pressing portion 33 substantially perpendicular to the pressed plate 32 on a third end.

Figure 5:
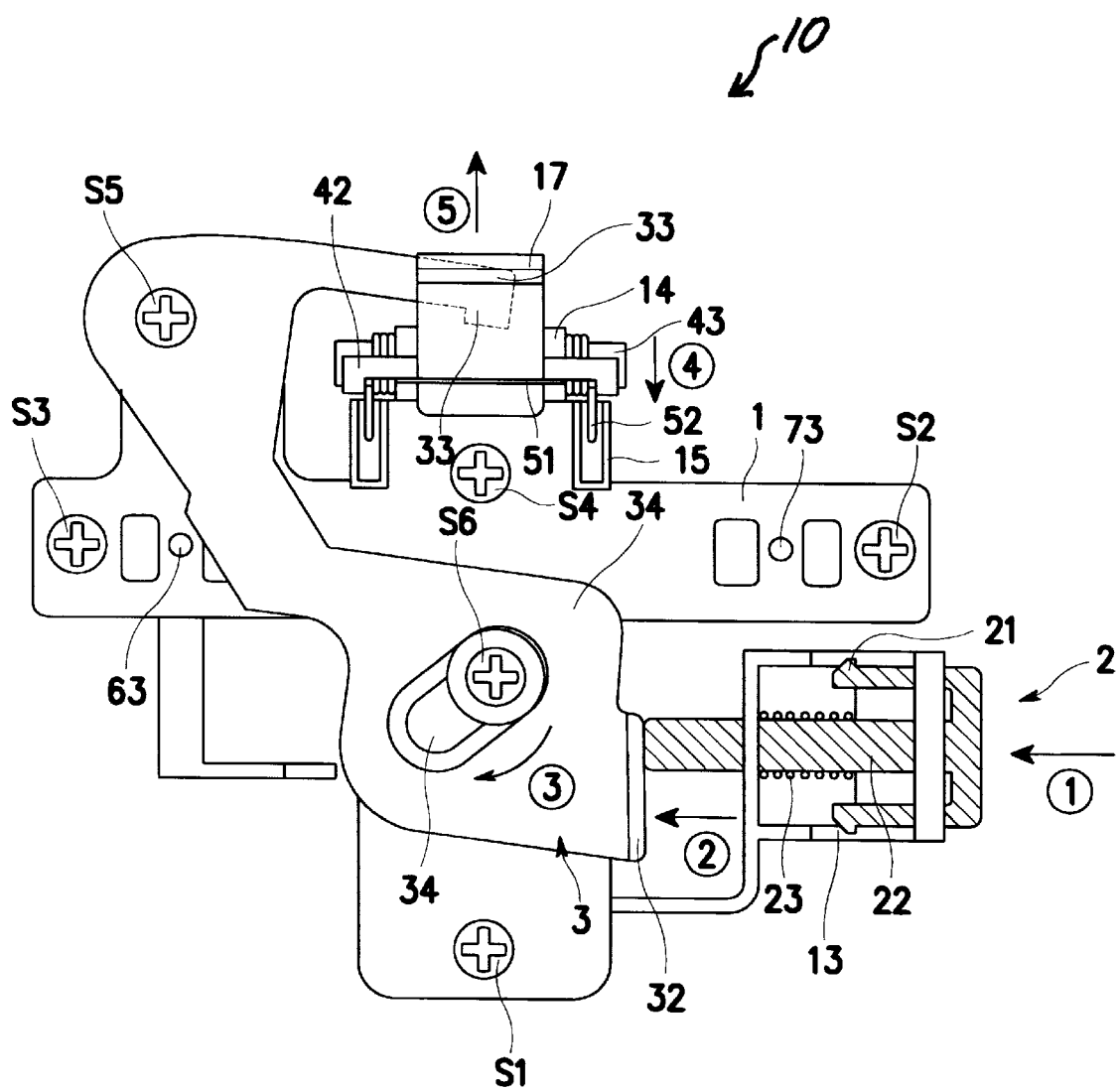
FIG. 5 is a bottom view of the locking module in an operative mode for releasing the portable phone placed on the cradle.

The ejector cam 3 is configured to radially move a limited degree with respect to cylindrical protrusion 16 to displace guide hole 34 about screw S6. Radial movement of ejector cam 3 is caused by depression of locker key 2 as shown by FIG. 5 and further described below. For example upon depression of the locker key 2 and with the locker 4 interlocked with the pressing portion 33, a force applied to the locker 4 in a direction perpendicular to the direction of movement of the locker key 2 will unlock the portable phone.

Figure 6:
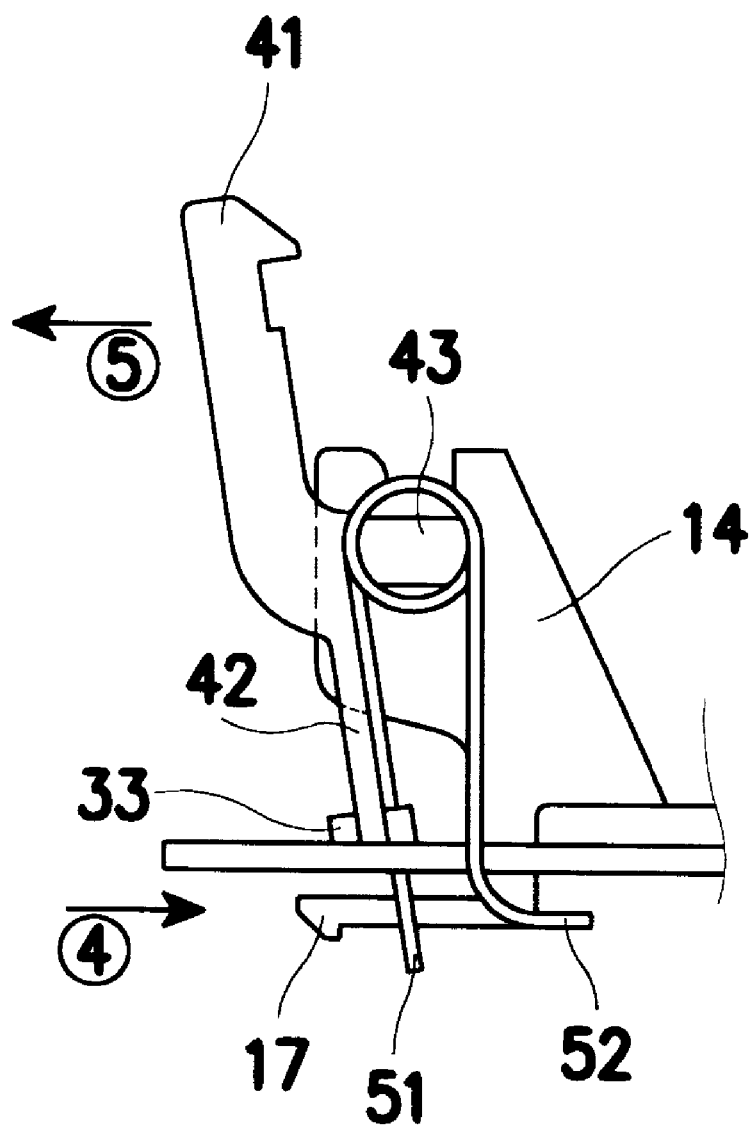
FIG. 6 is a partial side view of the locking module in the mode shown in FIG. 5.

The locker 4 includes the hook 41 in an upper portion, the engaging portion 42 laterally extending at a lower potion, and a shaft 43 disposed across the center thereof and supported by the supporters 14. A central portion of a locker spring 5 encircles the shaft 43. The locker spring 5 has a first end 51 supported by the engaging portion 42 of the locker 4 and a second end 52 fixed to the fixing portion 15 of the base frame 1. The locker spring 5 limits the movement of the locker 4, as shown by FIG. 6, and provides a restoring force to the locker 4 to cause the locker 4 to return to an inoperative mode.

The first ejector 6 has hooks 62 on opposite surfaces, a semicircular upper end portion 61, and a rod 63 extending downward. The second ejector 7 has hooks 72 on opposite surfaces, a semicircular upper end portion 71, and a rod 73 extending downward. The rods 63 and 73 are wound with first and second compressed coil springs 64 and 74, respectively, to provide restoring forces to the first and second ejectors 6 and 7.

The first and second ejectors 6 and 7 are inserted into the first and second compartments 11 and 12 to limit the amount of vertical movement of the ejectors. The rods 63 and 73 are inserted into holes formed on the bottom of the base frame 1 (FIG. 3) to guide the movement of the first and second ejectors 6 and 7. The upper end portions 61 and 71 of the first and second ejectors 6 and 7 are exposed from the surface of the cradle plate 110 to make a close contact with the lower surface of the portable phone when the portable phone is cradled.

The locker key 2 has hooks 21 at opposite sides and an elongate rod 22. The rod 22 is wound with a key spring 23 and inserted into an opening 13a when the locker key 2 is placed within the third compartment 13. Further, when the locker key 2 is placed within the third compartment 13, the hooks 21 engage protrusions within the third compartment 13 (FIG. 3) to secure the locker key 2 within the third compartment 13 and to ensure limited linear movement of the locker key 2 along its longitudinal axis. The key spring 23 provides a restoring force to the locker key 2 after the locker key 2 is moved along its axis.

In FIG. 3, the base frame 1 is fixed to the various components of the locking module 10 by screws S1 to S4. A screw S5 fixes the ejector cam 3 to the base frame 1, and as mentioned above, screw S6 is fit into the guide hole 34 to limit the amount of radial movement of the ejector cam 3.

With reference to FIGS. 2, 5 and 6, a description will now be provided with respect to a force transferring path when a predetermined pressing force is applied to the locker key 2 to move the locker key 2 from a first position (FIG. 3) to a second position (FIG. 5) along its longitudinal axis for detaching the portable phone from the cradle 100. When a user depresses the locker key 2 in a direction as indicated by arrow ①, the force is applied to the pressed plate 32 through the rod 22 in a direction as indicated by arrow ②. At the same time, the ejector cam 3 radially moves with respect to the cylindrical protrusion 16 from a first position to a second position in a direction as indicated by arrow ③, and then the pressing portion 33 transfers the force to the engaging portion 42 of the locker 4 in a direction as indicated by arrow ④. The hook 41 then retreats in a direction as indicated by arrow ⑤. Thus, the portable phone is released and the restoring forces of springs 64 and 74 of the first and second ejectors 6 and 7 automatically push the portable phone upward.

With reference to FIGS. 5 and 6, when the locker key 2 is depressed, the rod 22 radially moves the ejector cam 3 clockwise using the screw S5 as the pivot point, and the pressing portion 33 applies a force to the engaging portion 42 of the locker 4, thereby pushing the hook 41 backward. As a result, the portable phone is released and the first and second ejectors 6 and 7 push the portable phone upward. If the pressing force is removed, the locking module 10 is set to the inoperative mode as shown by FIGS. 3 and 4 by the restoring forces applied by locker spring 5 and key spring 23.

The locking module 10 of the present invention is effective in fixedly holding a portable phone having locking grooves on the upper and lower surfaces thereof in a vehicle, thereby leaving the hands of the user free. Furthermore, the cradle 100 of the present invention is applicable to the structural characteristics of any portable phone on the basis of the locking mechanism disclosed above.

Although an illustrative embodiment of the present invention has been described herein with reference to the accompanying drawings, it is to be understood that the invention is not limited to that precise embodiment, and that various other changes and modifications may be affected therein by one skilled in the art without departing from the scope or spirit of the invention. All such changes and modifications are intended to be included within the scope of the invention as defined by the appended claims.

What is claimed is:

1. A locking module for locking a phone in a phone cradle, the locking module comprising:
   a base frame;
   a locker key movably engaging the base frame, the locker key configured to move along an axis thereof;
   a radially movable ejector cam positioned between two approximately orthogonal restoring forces, the ejector cam being movably fixed to the base frame and having a pressing portion, the ejector cam being operatively associated with the locker key to move from a first position to a second position upon movement of the locker key along the axis thereof; and a locker movably fixed to the base frame, the locker being operatively associated with the pressing portion of the ejector cam to move in a direction substantially perpendicular to the axis of the locker key upon movement of the ejector cam from the first position to the second position.

2. The locking module of claim 1, wherein the locking module further comprises:

a locker spring operatively associated with the locker and having a first end supported by the locker and a second end fixed to the base frame for providing a restoring force to the locker after movement of the locker in the direction substantially perpendicular to the axis of the locker key; and first and second ejectors mounted to the base frame for supporting the phone when the phone is fixed in the phone cradle and operatively associated with the locker key for pushing the phone upward upon movement of the locker key along the axis thereof.

3. The locking module of claim 2, wherein the base frame comprises first, second and third compartments for placement of the locker key, the first ejector and the second ejector therein, respectively, and supporters at opposing positions of a frontal portion for movably fixing the locker thereto, and a fixing portion extending downward for fixing the second end of the locker spring.

4. The locking module of claim 1, wherein the ejector cam includes a hinge hole at a first end matingly engaging a protrusion extending from the base frame, and an erect pressed plate at a second end engaging the locker key, wherein upon movement of the locker key along the axis thereof the locker key pushes the erect pressed plate and causes movement of the ejector cam from the first position to the second position about the protrusion.

5. The locking module of claim 4, wherein the pressing portion is substantially perpendicular to the erect pressed plate.

6. The locking module of claim 1, wherein the locker key comprises hooks at opposite sides for engaging the base frame and a rod extending along the axis thereof, the rod being wound with a key spring to elastically support the locker key and to provide a restoring force to the locker key after movement of the locker key along the axis thereof.

7. The locking module of claim 1, wherein the locker comprises a hook in an upper portion, a laterally extending engaging portion in a lower portion for supporting the first end of the locker spring, and a shaft disposed across the center and supported by the base frame.

8. The locking module of claim 2, wherein the locker spring includes a central portion between the first end and the second end coaxially disposed about a shaft of the locker.

9. The locking module of claim 1, wherein the ejector cam further includes a guide hole configured to receive a screw for movably fixing the ejector cam to the lower surface of the base frame and for guiding the ejector cam from the first position to the second position.

10. The locking module of claim 9, wherein the guide hole is shaped into a slot elongated substantially along the direction of movement of the ejector cam.

11. A locking module for locking a phone in a phone cradle, the locking module comprising:

a base frame;

a locker key movably engaging the base frame, the locker key configured to move along an axis thereof;

a locker movable about a fixed axis of rotation, the axis of rotation being fixed with respect to the base frame for locking the portable phone; and means operatively associated with the locker key for transferring a force from the locker key to the locker upon movement of the locker key along the axis thereof to move the locker in a direction substantially perpendicular to the axis of the locker key to unlock the phone.

12. The locking module of claim 11, wherein the means for transferring a force includes an ejector cam movably fixed to the base frame and having a pressing portion configured to engage the locker, the ejector cam being operatively associated with the locker key to move from a first position to a second position upon movement of the locker key along the axis thereof, wherein the ejector cam transfers the force via the pressing portion to the locker to move the locker in the direction substantially perpendicular to the axis of the locker key to unlock phone.

13. The locking module of claim 11, further comprising means for restoring the locker to an inoperative mode after the locker moves in the direction substantially perpendicular to the axis of the locker key.

14. The locking module of claim 11, further comprising means for restoring the locker key to an inoperative mode after the locker key moves along its axis.

15. A locking module for locking a phone in a phone cradle, the locking module comprising:

a base frame having first, second and third compartments, supporters at opposite positions, and a fixing portion extending downwardly;

a locker key configured for placement within the third compartment and for movement along an axis of the locker key;

an ejector cam movably fixed to the lower surface of the base frame and having a hinge hole at one end configured to receive a protrusion from the base frame, an erect pressed plate at another end configured to interlock with the locker key, and a pressing portion substantially perpendicular to the pressed plate at a third end, the ejector cam being configured to radially move with respect to the protrusion;

a locker movably fixed to the supporters and operatively associated with the pressing portion of the ejector cam, the locker being configured to move in a direction substantially perpendicular to said axis;

a locker spring operatively associated with the locker and having a first end supported by the locker and a second end fixed to the fixing portion of the base frame for providing a restoring force to the locker after moving substantially perpendicular to said axis; and first and second ejectors configured to be inserted within the first and second compartments, respectively, for supporting the phone when the phone is fixed in the cradle and for upwardly pushing the phone when the locker key is moved along the axis thereof for removing the phone from the phone cradle.

* * * * *